United States Patent [19]

Hauser

[11] 4,432,444
[45] Feb. 21, 1984

[54] FLUID FRICTION CLUTCH

[75] Inventor: Kurt Hauser, Stuttgart, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 242,821

[22] Filed: Mar. 12, 1981

[30] Foreign Application Priority Data

Mar. 13, 1980 [DE] Fed. Rep. of Germany ....... 3009665

[51] Int. Cl.³ .............................................. F16D 35/00
[52] U.S. Cl. .................................. 192/58 B; 192/82 T
[58] Field of Search ............................. 192/58 B, 82 T

[56] References Cited

U.S. PATENT DOCUMENTS

| 1,761,694 | 6/1930 | Sweet | 192/58 B |
| 3,463,282 | 8/1969 | Fujita et al. | 192/58 B |
| 3,696,899 | 10/1972 | Kongelka | 192/58 B |
| 3,907,084 | 9/1975 | Hall | 192/58 B |

FOREIGN PATENT DOCUMENTS 1290015 2/1969 Fed. Rep. of Germany.
2811647 10/1978 Fed. Rep. of Germany.
2804557 8/1979 Fed. Rep. of Germany.

OTHER PUBLICATIONS

DIN 4766, Teil 2, of Jun. 1975.

Primary Examiner—Allan D. Herrmann
Attorney, Agent, or Firm—Schwartz, Jeffery, Schwaab, Mack, Blumenthal & Koch

[57] ABSTRACT

Disclosed is a fluid friction clutch, comprising a drive disk having at least one first working surface; a housing enclosing said drive disk and being mounted rotatably with respect thereto, the housing including at least one second working surface in spaced relationship with the first working surface to form a gap therebetween; a device for selectively introducing a fluid working medium into the gap; and a device for removing the fluid working medium from the gap, wherein the first and/or second working surfaces comprise roughened surfaces.

19 Claims, 4 Drawing Figures

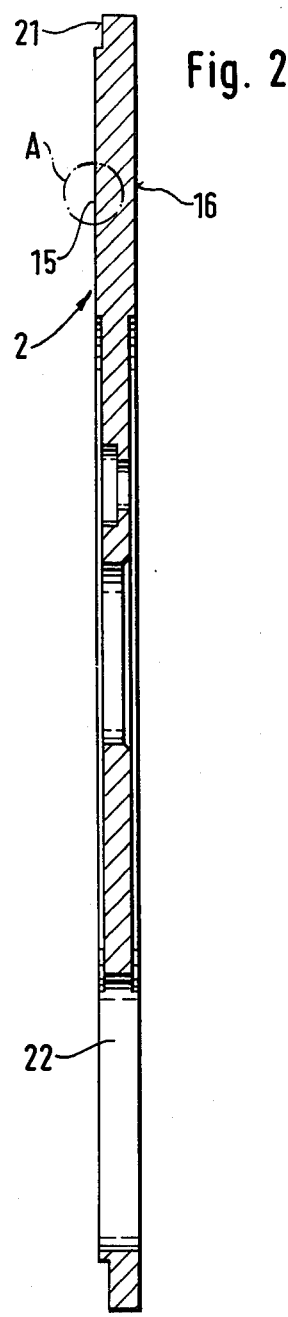
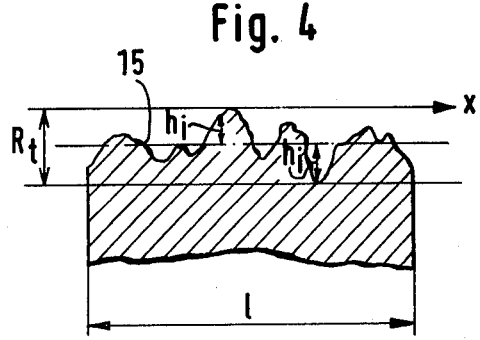

FLUID FRICTION CLUTCH

BACKGROUND OF THE INVENTION

The present invention relates to a fluid friction clutch and more especially to a fluid friction clutch of the type having two working surfaces separated by a gap which is adapted to receive a viscous fluid in a controlled manner, such as by means of a valve which is controllable as a function of temperature.

Such a fluid friction clutch is known, for example, from German Patent No. 12 84 186. In clutches of this type the torque is transmitted between the drive disk on the primary side and the housing on the secondary side, carrying for example a blower, by the shear forces of a viscous fluid present in the gap between the drive disk and the clutch housing. The magnitude of the torque which can be transmitted depends on the amount of working medium present in the two gaps between the drive disk and the clutch housing, i.e., the degree of filling. In order to prevent metal-to-metal contact, i.e., scoring between the drive disk and the clutch housing, such known drive disks are frequently equipped with non-metallic linings. Between these segment-like linings, channels are provided for the radially outwardly directed flow of the working medium, whereby the uniform distribution of the working medium within the gap is obtained even with partial degrees of filling. Furthermore, cork linings in particular have the capability of becoming saturated with the working medium and thus contribute to the assurance of a uniform distribution of the working medium. Such linings, however, are not advantageous from an economical standpoint, since they generate additional costs.

For this reason, as is known from German Auslegeschrift No. 26 02 608, friction linings of this type have already been eliminated. This, however, has resulted in disadvantages affecting the rotational speed behavior of the clutch during the engagement phase of the clutch at a certain temperature. Attempts have been made to eliminate these undesirable rpm fluctuations which are accompanied by the generation of disagreeable noise, by providing a temperature sensitive magnetic switch, which leads to the sudden opening of the valve for the working medium. But this type of black/white switching is not always desirable, as it leads to the abrupt engagement of the clutch and thus to torque impacts.

Known fluid friction clutches having smooth drive disks without linings, in addition to the abovementioned disadvantage of rotational speed fluctuation in the engagement phase, i.e., when partially filled, have the disadvantage that their engagement and disengagement are delayed. The delayed engaging of the clutch, when used for fans in combustion engines, can lead to overheating of the engine. The delayed disengagement of the fan increases the fuel consumption of the vehicle and extends the period of objectionable noise generation.

SUMMARY OF THE INVENTION

It is therefore an object of the present invention to provide an improved fluid friction clutch.

It is a further object of the invention to provide a fluid friction clutch of the type described above which operates with a drive disk or working surfaces, respectively, without the conventional linings.

Another object of the invention resides in providing a fluid friction clutch wherein the abovementioned disadvantageous rotational speed fluctuation in the transition range and the delayed engagement and/or disengagement are prevented.

In accomplishing the foregoing objects, there has been provided in accordance with the present invention a fluid friction clutch, comprising a drive disk having at least one first working surface; a housing enclosing the drive disk and being mounted rotatably with respect thereto, the housing including at least one second working surface in spaced relationship with the first working surface to form a gap therebetween; means for selectively introducing a fluid working medium into the gap; and means for removing the fluid working medium from the gap, wherein the first and/or second working surfaces comprise roughened surfaces. Preferably, the roughened surfaces have mean roughness values of 5 $\mu m \leq R_a \leq 2000$ $\mu m$, and more preferably a mean roughness value of 5 $\mu m \leq R_a \leq 50_x$ $\mu m$.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIG. 2 is a cross-sectional view of a drive disk for the clutch of the invention along the line II—II in FIG. 3;

FIG. 4 is an isolated view of a section of the working surface profile of the drive disk according to the invention.

DETAILED DESCRIPTION OF A PREFERRED EMBODIMENTS

Figure 1:
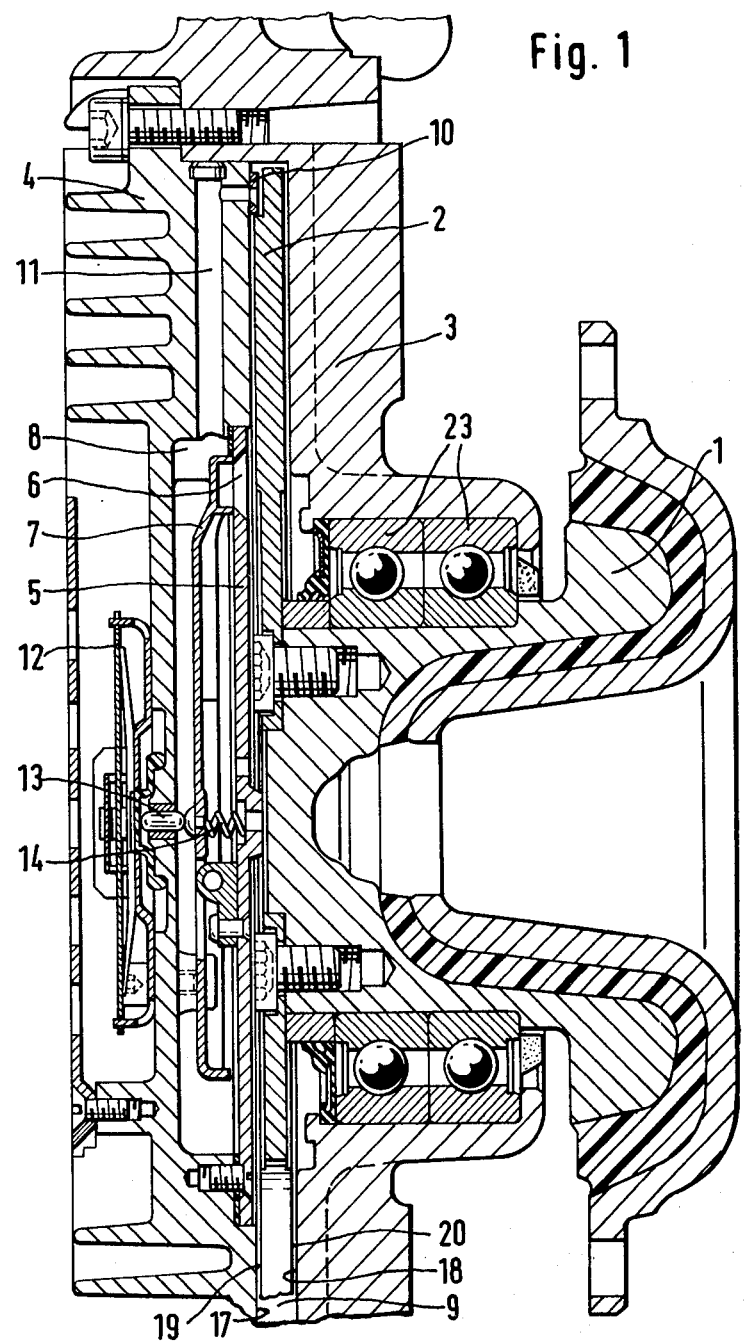
FIG. 1 is a cross-sectional view of a fluid friction clutch according to the present invention.

By means of the roughening of the working surfaces of the drive disk and/or the clutch housing according to the invention, rotational speed fluctuations during the engagement phase are avoided. Rather, the clutch continuously increases its number of revolutions with the progressive opening of the valve, i.e., with an increasing degree of filling. Furthermore, with roughened working surfaces, the clutch engages within a shorter period of time, following the attainment of a predetermined temperature. A further advantage has been achieved by that, by means of the roughening of the working surfaces, higher torques may be transmitted at the same viscosity of the working medium, or the same torque with a lower viscosity of the working medium. The use of a working medium with a lower viscosity leads to an improved engagement behavior.

Further advantageous embodiments of the invention are described hereinbelow. According to these embodiments, the roughened surface may be both metallic or non-metallic and may be obtained by different technical processes. All of these processes, namely, roughening, shot blasting, rough-turning (e.g., with a radius of the turning grooves between about 0.4 and 1.2 mm), straight knurling, etching, casting or the application of a rough coating, are characterized by simplicity and thus by economy. This aspect is of particular importance in the case of a mass-produced article such as fluid friction clutches for automotive vehicles.

An example of a preferred embodiment of the invention is illustrated in the drawings and shall be described in more detail with reference thereto.

FIG. 1 shows a fluid friction clutch equipped with a drive disk 2 roughened according to the invention. Fluid friction clutches of this type are used preferably for driving fans in the cooling system of internal combustion engines in automotive vehicles. The drive disk 2 is thus joined fixedly in rotation with the drive shaft 1, which in turn is driven by the internal combustion engine, not shown, for example, by the crank shaft of said engine. The clutch housing 3 is rotatingly supported on the drive shaft 1 by means of a double grooved ball bearing 23, and it is immobilized in the axial direction. In this way, the maintenance of a constant width of the working gap is assured and seizing of the working surfaces is prevented. The clutch housing 3 is closed off by a housing cover 4 and carries a fan (not shown) arranged, for example, behind the radiator of an automotive vehicle to provide the necessary transport of cooling air.

Provided in the housing cover 4 is a partition 5 comprising a valve orifice 6, which in turn may be opened and closed by means of the valve lever 7. The partition 5 divides the inside of the clutch housing 3, 4 into a reservoir chamber 8 and a working chamber 9. From the latter, the working medium is recycled into the reservoir chamber 8 by way of the baffle barrier 10 and return conduit 11.

Figure 3:
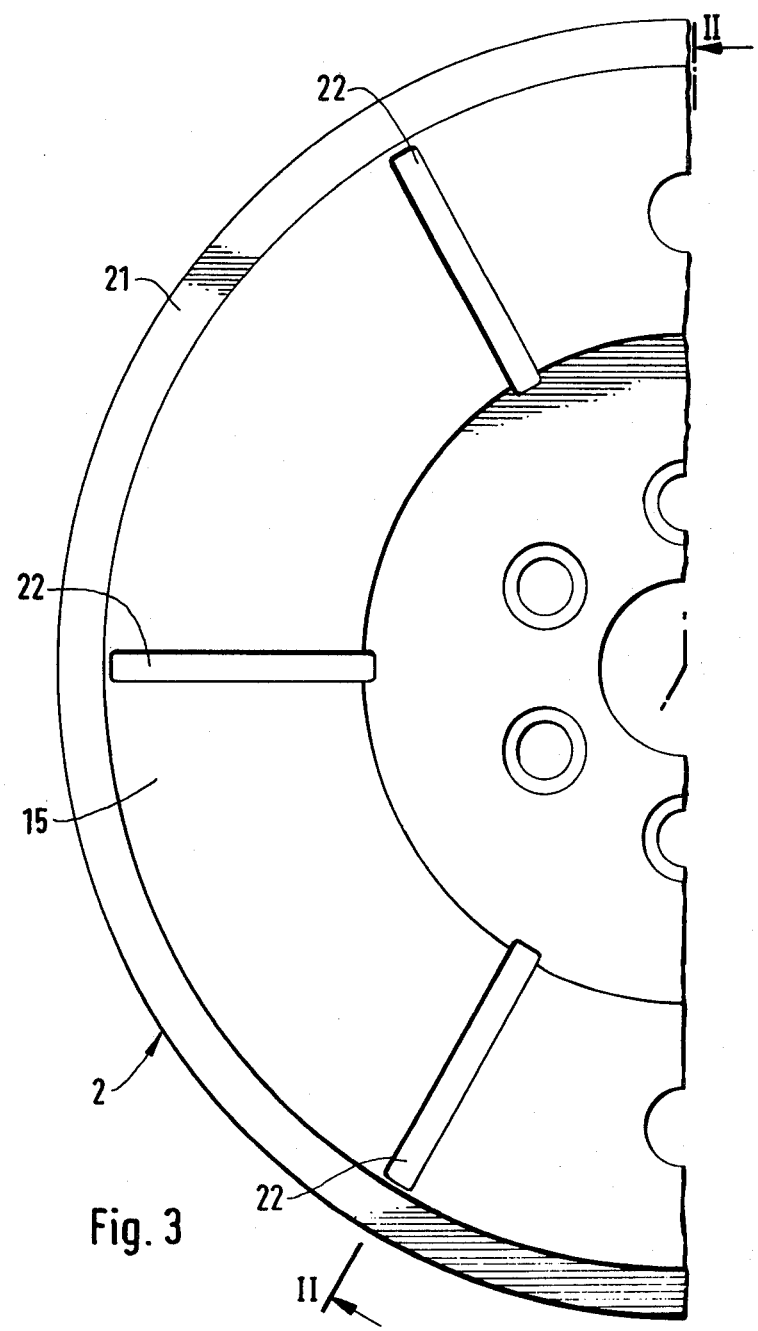
FIG. 3 is a partial plan view of the drive disk according to the invention.

FIGS. 2 and 3 illustrate the drive disk 2, on the one hand, in cross-section and, on the other, in a partial plan view, as it is installed in FIG. 1 in the fluid friction clutch. The first working surfaces 15 and 16 on either side of the drive disk 2 may be seen as separately treated annular surfaces. An annular surface 21 is arranged offset with respect to the front working surface 15, at the outermost periphery of the drive disk 2. This annular surface 21 engages the baffle barrier 10 and serves for the transport away of the working medium. The drive disk 2 further contains a plurality of radially extending elongated holes 22, arranged about the circumference of said drive disk, provided for the passage of the working medium from the front side 15 to the rear side 16.

Outside of the cover 4 is located a temperature dependent control element, known in itself, which in the present case consists of bimetallic strip 12 (FIG. 1) and which is exposed to the cooling air. The bimetallic strip transmits its deformation under the effect of a change in temperature to a control pin 13, which in turn actuates the valve lever 7 against a compression spring 14, thereby opening or closing the valve orifice 6. In the reservoir chamber, the working medium is found; it is a viscous fluid which is commercially available, for example, under the commercial designation of Dow Corning 211 Fluid or Wacker Silicone Oil AK. These silicone oils, used customarily in fluid friction clutches for automotive vehicles, have viscosities within a range of 1,000 to 60,000 centistokes. Upon opening of the valve orifice 6, the working medium enters the working chamber 9 from the reservoir chamber 8, i.e., it enters the working gaps 19 and 20, located between the working surface 17 of the housing cover 4, and the working surface 18 of the clutch housing 3, on one hand, and the working surfaces 15 and 16 of the drive disk 2, on the other. As soon as the working medium fills the working gaps partially or completely, a torque is transmitted between the drive disk 2 and the clutch housing 3, as the result of the shear forces generated. The centrifugal force urges the working medium from the working gaps in the radially outward direction and it is pumped away via the baffle barrier 10.

The most preferred aspect of the invention may now be seen in FIG. 4, which displays a detail at A in FIG. 2 of the working surface 15. The first working surfaces 15 and 16 of the drive disk 2 and also the second working surfaces 17 and 18 of the clutch housing 3,4 are roughened in keeping with the invention, so that, according to DIN 4762, Sheet 1, roughness is not less than a certain average roughness or peak-to-valley value $R_a$. This average roughness or peak-to-valley value $R_a$ is determined in accordance with DIN 4762, Sheet 1, Page 2, by the following fomula:

$$R_a = \frac{1}{1} \int_{x=0}^{x=1} |h_i| \cdot dx$$

The amounts $h_i$ are the deviations of the actual drawn profile from the mean profile, which is indicated by the dot-and-dash line in FIG. 4. This standardized average roughness value $R_a$ may be determined directly by scanning the surface with commercially available measuring instruments.

The surprising effect of the roughening of the working surfaces according to the invention consists of the fact that the working surfaces 15, 16, 17 and 18 are wetted more uniformly and with better control, and the working gaps 19 and 20 are filled more uniformly than in the case of the above-mentioned smooth disk. Thus, when the valve lever 7 opens the valve orifice 6, initially only in part, and thereby only a slight volume of the working medium enters the working gaps 19 and 20 from the reservoir chamber 8, this results in a continuous, uniform filling of the working gaps 19 and 20, so that the number of revolutions of the clutch housing 3 will also rise in a continuous manner. This eliminates the known, undesirable fluctuations of the number of revolutions during the engagement phase of the clutch. Evidently, these known rpm fluctuations resulted from the fact that the working fluid which exits from the reservoir chamber 8 by way of the valve orifice 6 and is rotating at a relatively low rotating velocity, for example 1,500 rpm, is immediately thrown outwardly by the drive disk, which is rotating at a relatively high rotating velocity, for example 5,000 rpm. As a result, the process is rendered extremely unstable and uncontrollable. In the known clutches, therefore, the working gaps were partially filled for a short period of time, and then emptied, leading to the undesirable fluctuations of the number of revolutions. By means of the roughening of the working surfaces according to the invention, a uniform wetting and a uniform filling of the working gaps are obtained, i.e., the uncontrollable throwing of the working medium and the fluctuations in the number of revolutions associated with it are eliminated. It is a further advantage of the roughening of the working surfaces according to the invention that the engagement and disengagement of the clutch may be predetermined better and thus are controllable. Due to the uniform filling and emptying of the working gaps, the clutch will be engaged and disengaged at a predetermined point in time, so that overheating of the engine and unnecessary fuel consumption and noise generation will be avoided. As the result of the uniform wetting of the working surface, there is furthermore a greater transferable torque when using the same working fluid, i.e., with the same viscosity and the same gap width. In case of a predetermined torque to be transmitted, the viscosity of the working medium may therefore be lower, so that a more accurately determinable engaging behavior of the clutch is obtained. The roughening of the working surfaces according to the invention may be obtained by many different processes. Among the different processes, shot blasting has been found to be particularly advantageous in its effect of the wetting of the working surfaces.

If the baffle barrier 10 is urged by the pressure of a spring against the offset annular surface 21, the latter must remain smooth and thus must be covered during the roughening process. If, however, a definite gap is provided between the annular surface 21 and the baffle barrier 10, so that there is no contact, the outer annular surface 21 may also be roughened. This has the advantage that the rough annular surface 21 is better able to entrain the working medium, thereby achieving an improved pumping effect. This improves the disengaging behavior of the clutch even further.

The invention is not restricted to flat working surfaces, but may be applied with the same advantages to cylindrical or conical working surfaces, for example, in the case of a drive disk with a cup-shaped configuration.

What is claimed is:

1. A fluid friction clutch, comprising:
    a drive disk having at least one first working surface;
    a housing enclosing said drive disk and being mounted rotatably with respect thereto, said housing including at least one second working surface in spaced relationship with said first working surface to form a gap therebetween;
    means for selectively introducing a fluid working medium into said gap; and
    means for removing the fluid working medium from said gap
    wherein at least one of said first and second working surfaces comprises a roughened surface, said roughening providing a more uniform filling of the working gap thus reducing uncontrollable throwing of said working medium and fluctuations in r.p.m. as said working medium is introduced.

2. A fluid friction clutch according to claim 1, wherein said roughened surfaces have mean roughness values of $R_a \geq 5$ $\mu$m.

3. A fluid friction clutch according to claim 2, wherein said roughened surfaces have mean roughness values of $R_a \leq 2000$ $\mu$m.

4. A fluid friction clutch according to claim 1, wherein said roughened surfaces have mean roughness values of $5 \mu m \leq R_a \leq 50 \mu m$.

5. A fluid friction clutch according to claim 1, wherein said roughened surfaces comprise metallic surfaces.

6. A fluid friction clutch according to claim 1, wherein said roughened surfaces comprise synthetic resinous surfaces.

7. A fluid friction clutch according to claim 1, wherein said working surfaces comprise surfaces roughened by shot blasting.

8. A fluid friction clutch according to claim 1, wherein said working surfaces comprise surfaces produced by rough turning.

9. A fluid friction clutch according to claim 8, wherein the radius of the turning grooves is from about 0.4 to 1.2 mm.

10. A fluid friction clutch according to claim 1, wherein said working surfaces comprise surfaces roughened by straight knurling.

11. A fluid friction clutch according to claim 1, wherein said working surfaces comprise surfaces produced by chemical treatment.

12. A fluid friction clutch according to claim 11, wherein said chemical treatment comprises etching.

13. A fluid friction clutch according to claim 1, wherein said working surfaces comprise surfaces produced by the casting process using suitably shaped molds.

14. A fluid friction clutch according to claim 1, wherein said working surfaces comprise surfaces produced by the application of a grainy coating.

15. fluid friction clutch according to claim 1, wherein said working surfaces comprise surfaces produced by the application of a fibrous coating.

16. A fluid friction clutch according to claim 1, wherein said removing means comprises an annular surface arranged on said drive disk in an axially offset manner with respect to said first working surface and a baffle barrier arranged on the side of the housing opposite to said offset annular surface.

17. A fluid friction clutch according to claim 16, wherein said annular surface comprises the same degree of roughness as said working surfaces.

18. A fluid friction clutch according to claim 1, wherein said drive disk comprises two of said first working surfaces and said housing comprises two of said second working surfaces, one in spaced relationship with each of said first working surfaces to define two gaps.

19. A fluid friction clutch according to claim 1, wherein said selective introducing means comprises means for selectively introducing said fluid working medium in response to a change in temperature.

* * * * *